United States Patent [19]

Anderson

[11] Patent Number: 4,920,689

[45] Date of Patent: May 1, 1990

[54] WATER KITE AND METHOD OF USING THE SAME

[76] Inventor: Kenneth D. Anderson, 705 W. 30th, Kearney, Nebr. 68847

[21] Appl. No.: 303,717

[22] Filed: Jan. 27, 1989

[51] Int. Cl.$^5$ ............................................. A01K 91/00
[52] U.S. Cl. ..................................... 43/43.13; 43/26.1; 43/26.2
[58] Field of Search ...................... 43/43.13, 26.1, 26.2

[56] References Cited

U.S. PATENT DOCUMENTS

| | | | |
|---|---|---|---|
| 3,181,266 | 5/1965 | Leufuenius | 43/43.13 |
| 3,230,660 | 1/1966 | Meyers | 43/43.13 |
| 3,818,624 | 6/1974 | Duffy | 43/43.13 |
| 4,524,538 | 6/1985 | Halvorsen | 43/43.13 |

*Primary Examiner*—Nicholas P. Godici
*Assistant Examiner*—James Miner

*Attorney, Agent, or Firm*—Bernard L. Kleinke; Jerry R. Potts; William P. Waters

[57] ABSTRACT

A water kite has a single elongated generally flat plate integrally connected to a float having generally pointed terminal ends. A pair of spaced apart eyelets are disposed on one side of the plate adjacent to the float for attaching slidably the water kite to a fishing line without removing the line. A rotating arm assembly having a base and arm is centrally disposed between the eyelets on the plate. In order to control the trolling relationship of the kite relative to the location of the fisherperson, the base is adapted with a set of equally spaced apart detents for retaining releasably the arm against rotation with respect to the base in a selected one of a plurality of discrete positions. A release mechanism is secured at the tip of the arm for securing releasably the fishing line to the water kite, in order to set the tension on the line and to allow the fishing line to be disengaged easily from the mechanism whenever a fish strikes the line or bait.

9 Claims, 2 Drawing Sheets

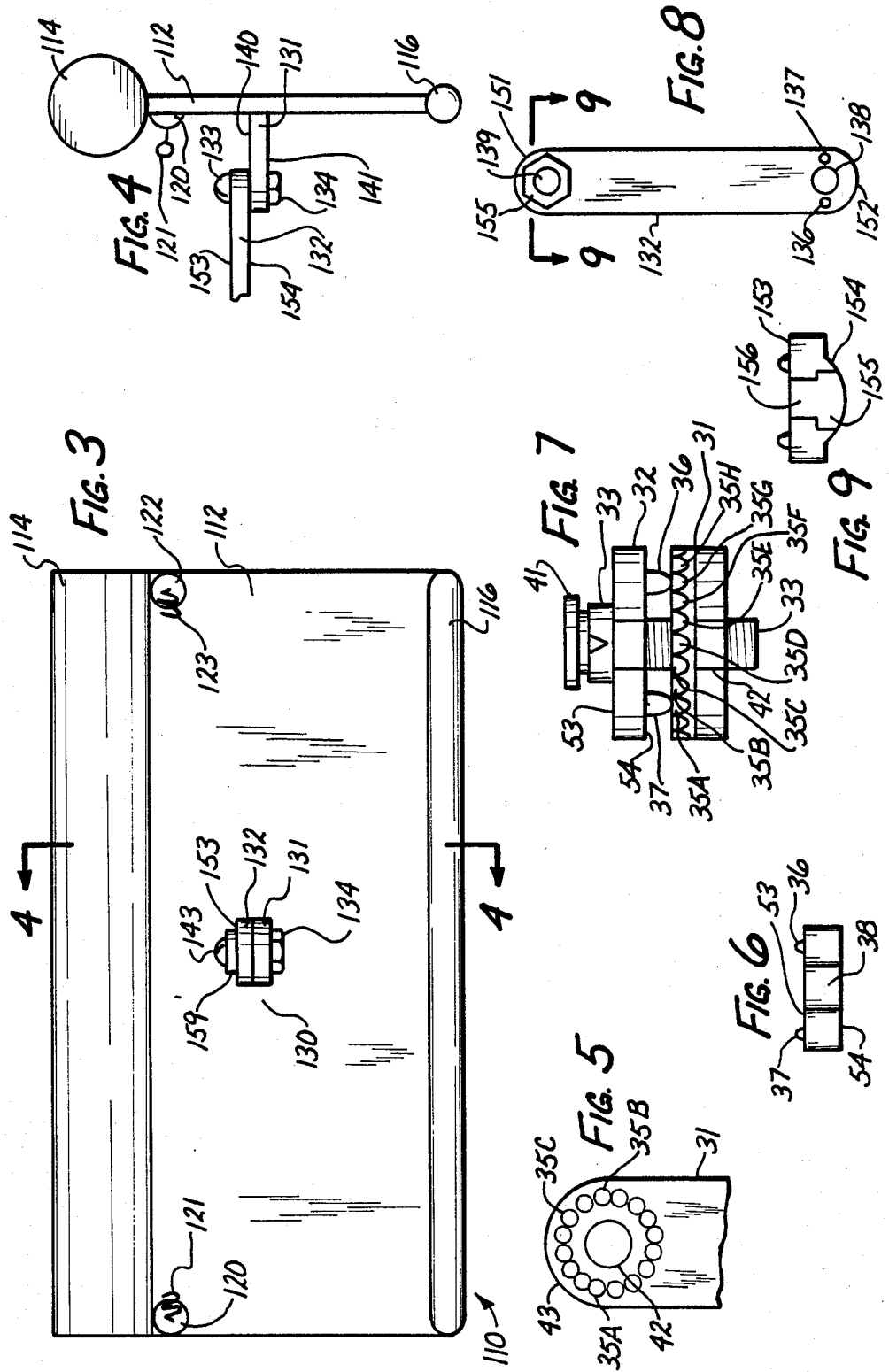

WATER KITE AND METHOD OF USING THE SAME

TECHNICAL FIELD

The present invention relates in general to fishing apparatus and method of using it, and it more particularly relates to a new and improved water kite for guiding a fishing line to a selected location in a moving stream or to a selected location with respect to a moving boat.

BACKGROUND ART

There have been many different kinds and types of fishing devices, which enable the location of a fishing line to be controlled, whether the fisherperson is standing on the bank of a moving stream, or seated in a slow moving boat. For example, reference may be made to the following U.S. Pat. Nos. 1,227,300; 1,466,601; 2,798,331; 2,920,414; 3,067,539; 3,181,266; 3,318,638; 4,138,793; 4,464,858; 4,524,538; 4,745,202; and 4,763,437.

While such prior known devices have been successful in some applications it has been difficult, if not impossible, to provide a device that will allow a fisherperson to easily and quickly attach a water kite device to a fishing line so that the device maintains a high degree of stability as it travels through the water and also positively releases the fishing line when a fish strikes a baited lyre attached to the line.

Several attempts have been made to overcome the aforementioned problems. For example, in U.S. Pat. No. 4,524,538 there is disclosed a water kite including a generally flat, elongated float member having a front end general tapered from one side to the other and rearwardly, and having a weight on one side edge to cause it to be heavier than the other. A mounting bracket disposed on one side of the float member projects perpendicularly outwardly therefrom for supporting a line engaging device of the type that squeezes the line between a stationary member and an eccentric rotable member having a spring which is pivoted over center when the fishing line is engaged. A trip lever engaging the rotable device is provided so that when a fish strikes the baited end of the line, the lever rotates the device and releases the line from the device.

While this attempted solution allows the fishing line to be attached to the water kite, the device has proven to be less than totally satisfactory, in that it has caused other problems. More particularly, the line engaging device is spring loaded and relatively complex and difficult to use. For example, a fisherperson must use both hands to set the tripping mechanism by looping the line under its engaging arm and then against a retaining tab while simultaneously rotating the device into a locking engagement position. Such a manipulation is difficult and requires precise coordination of the fisherpersons fingers and hands.

Moreover, because of the device's small hooking and retaining surfaces the fisherperson must use his or her finger tips to accomplish the loading technique. Such manipulation would therefore become extremely difficult if the fingers of the fisherperson were wet and cold. Also, because of the intricate and complex method of setting the line on the device, the fisherperson's fingers could easily slip as the lever mechanism is being rotated into locking position resulting in the lever striking and cutting the fisherperson's fingers.

Another problem with the device is the amount of force that is required to trip the lever. More particularly, the tripping force is fixed by the biasing force of the mechanism's spring. This force is constant regardless of the type of fish that is being caught and regardless of the drag force created against the device by the speed of a stream or the speed of the boat towing the device. Such an arrangement is less than desirable as smaller fish may not be able to trip the lever. Moreover, if the spring force is to weak, the turbulence of the water may accidently trip the device necessitating that the fisherperson repeat the complex setting technique.

Therefore it would be highly desirable to have a water kite and method of using it that would enable a fisherperson to easily and quickly attach the fishing line to the device in a quick and highly convenient manner. It would also be highly desirable for the line to be attached to the device so that it could be used to catch a variety of fish regardless of their size.

Another problem associated with the device disclosed in U.S. Pat. No. 4,524,538 is associated with its stability as being towed through the water. For example, the weights associated with the device is not distributed uniformally across the axial length of the device. Moreover, the plate like body of the device is not symmetrical. Finally, the fishing line attached to the device is only attached fixedly at two points. Such an arrangement does not allow the device to travel through the water in a smooth stable manner, thus, it may accidentally trip the lever mechanism or become entangled accidentally with another device that may be used by the fisherperson in the same general area.

Therefore it would be highly desirable to have a new and improved water kite and method of using it that it would be highly stable as it travels through the water so that its path of travel is relatively fixed with relation to the trolling boat.

Another problem which faces the devices of the prior art is that they are relatively complex in structure and do not readily lend themselves to providing the fisherperson with an easy and convenient method of controlling the angular placement of the water kite in the water relative to the trolling boat or fisherperson so that multiple lines may be utilized by the fisherperson from a single location.

Several attempts have been made to overcome the aforementioned control problems so that multiple lines may be set by a single fisherperson with a positive technique for releasing the lines from the device when a fish strikes the baited lure attached to the fishing line.

For example, a water kite having a fixed direction arm as disclosed in U.S. Pat. No. 4,524,538 allows only one water kite to be utilized by a fisherperson as the placement angle between a pair of these water kites would be identical, thereby, resulting in the lines between two fishing poles utilized by a fisherperson becoming tangled together.

One attempt to overcome the aforementioned problem is found in U.S. Pat. No. 3,230,660 where there is disclosed a water kite having a float member that has a bracket which projects laterally outwardly therefore. A floating support pivotally attached to the bracket. A positioner is pivotally connected to the support arm and includes a plurality of notches that are engagable by a pin disposed on the float member to allow the support arm to be angularly positioned relative to the float member.

While this attempt allows the fisherperson to select various trajectories by adjusting the continuously adjustable arm its use is limited to two or possibly three devices because of the small differences in the angular placement settings; i.e., the arm is limited to an angular displacement of approximately 30 degrees.

Therefore it would be highly desirable to have a new and improved water kite and method of using it that would enable a fisherperson to set multiple lines in close proximity to one another without the danger of line entanglement.

DISCLOSURE OF INVENTION

Therefore, it is the principal object of the present invention to provide a new and improved water kite that allows a fisherperson to easily and quickly attach a fishing line to the water kite device.

Another object of the present invention is to provide a new and improved water kite and method of using it that assures that the device is highly stable as it travels through the water.

Yet another object of the present invention is to provide a new and improved water kite and method of using it that permits a fisherperson to control the placement of the fishing line in a desired location in the water.

Briefly, the above and further objects of the present invention are realized by providing a new and improved water kite and technique for using it. More particularly the water kite includes a single elongated generally flat symmetrical plate integrally connected to a float having generally pointed terminal ends. A pair of spaced apart eyelets are disposed on one side of the plate adjacent the float for receiving and slidably attaching a fishing line to the water kite.

The water kite also includes a rotating arm assembly having a base and arm that is centrally disposed between the eyelets on the plate. In order to control the trolling relationship of the kite relative to the location of the fisherperson, the base is adapted with a set of equally spaced apart detents for releasably retaining the arm against rotation with respect to the base in one of sixteen selected discrete positions.

A release mechanism is secured at the tip of the arm for releasably securing the fishing line to the water kite. In order to set the tension on the line and to allow the fishing line to be disengaged easily from the water kite whenever a fish strikes the line or bait the mechanism includes an adjustable tension setting.

The generally parallel relationship of the fishing line to the water kite plate when the line is slidably attached to the device through the equally spread apart eyelets, forms a triangular arrangement between the kite and the line when the line is fixedly attached to the end portion of the arm assembly. This triangular relationship creates a uniquely stable orientation between the line and the water kite so that as the kite is pulled through the water by the line it is highly stabilized.

BRIEF DESCRIPTION OF DRAWINGS

The above mentioned and other objects and features of this invention and the manner of attaining them will become apparent, and the invention itself will be best understood by reference to the following description of the embodiment(s) of the invention in conjunction with the accompanying drawings, wherein:

FIG. 3 is a front schematic view illustrating another water kite which is also constructed in accordance with the present invention;

FIG. 4 is a partial fragmentary end view of the water kite of FIG. 3 taken substantially on line 4—4 thereof;

FIG. 5 is a greatly enlarged partial fragmentary top plan view of the base portion of rotating arm assembly utilized on the water kite of FIGS. 1 and 3;

FIG. 6 is a greatly enlarged front elevational view of the arm portion of the arm of FIG. 1 with the retaining mechanism and mounting hardware removed.

FIG. 7 is a greatly enlarged front view of the base and arm portions of the rotating arm assembly of FIG. 3 with the securing nut removed;

FIG. 8 is a greatly enlarged bottom plan view of the arm portion of the rotating arm assembly utilized on the water kite of FIG. 3; and FIG. 9 is a greatly enlarged inverted front elevational view of the arm portion of the rotating arm assembly of FIG. 3.

BEST MODE FOR CARRYING OUT THE INVENTION

Figure 1:
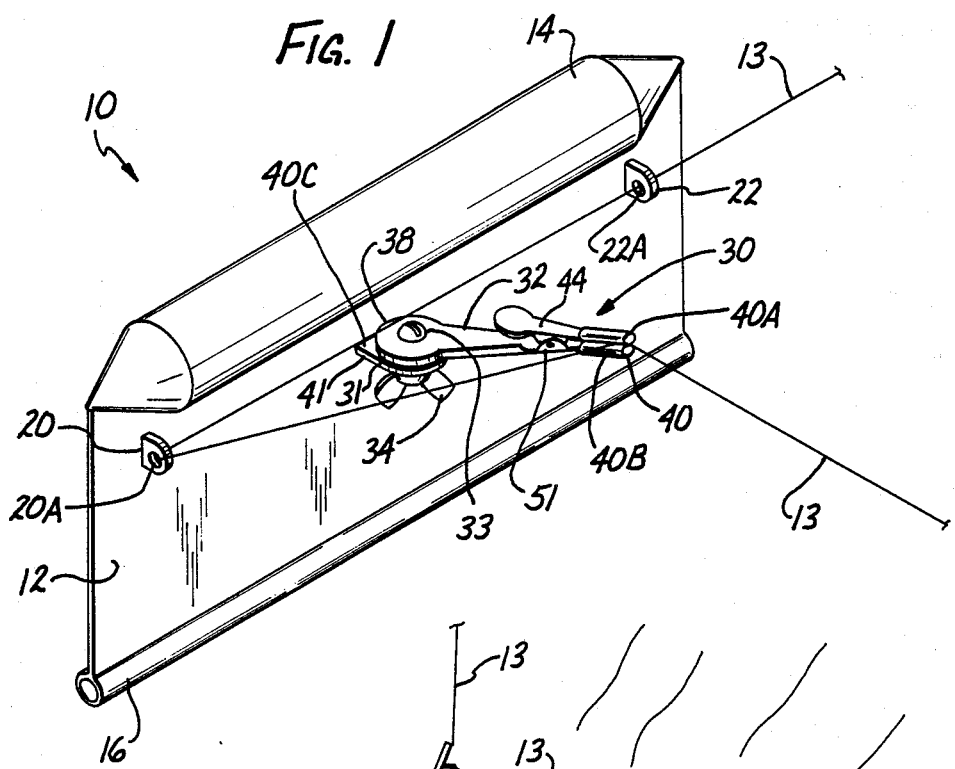
FIG. 1 is a pictorial view of a water kite, which is constructed according to the present invention.
Figure 2:
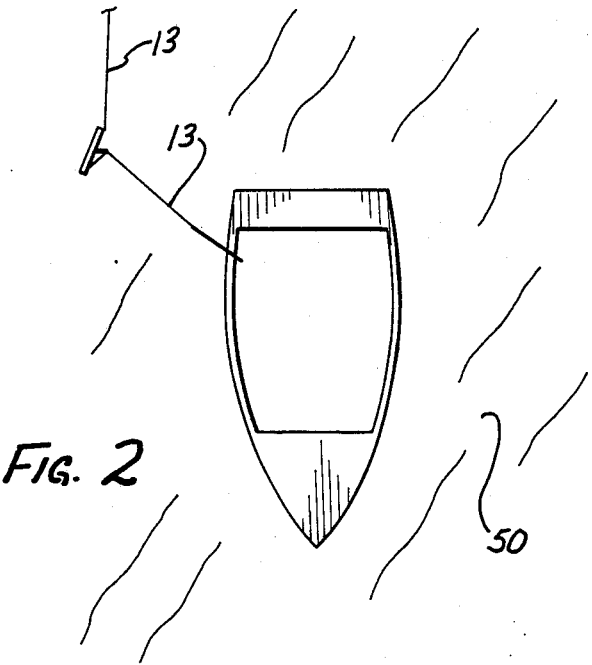
FIG. 2 is a schematic view illustrating the water kite of FIG. 1 and use of the invention for fishing a trolling line relative to a boat.

Referring now to the drawings, and more particularly to FIG. 1 thereof; there is illustrated a water kite 10, which is constructed in accordance with the present invention.

The water kite 10 generally comprises an elongated flat thin generally rectangular plate 12 integrally connected to a hollow tubular like elongated axially-extending float 14. The float 14 is disposed on the upper end of the plate 12, and it extends longitudinally substantially throughout the entire axial length of the plate 12. The float 14 is sized and proportioned to support the water kite 10. Disposed on the opposite end of the plate 12 is a solid tubular like elongated axially extending protuberance 16 that is integrally connected to the lower end of the plate 12. The protuberance 16 extends longitudinally substantially throughout the entire axial length of the plate 12 and acts as a stabilizing heel to hold the plate 12 in a generally upright position as the water kite is drawn through the water 50. The plate 12, float 14, and protuberance 16 are of a unitary structure and are composed of a suitable rigid material, such as plastic.

As best illustrated in FIG. 1, a pair of spaced apart parallel eyelets 20 and 22 protrude from one side of the plate 12 and are disposed at diametrically opposite ends of the plate 12 adjacent its upper corners. A pair of slits 20A and 22A are provided on each respective eyelet 20 and 22 for the purpose of allowing a fishing line 13 to be attached to the water kite 10 without removing the lure (not shown) from the line 13. Each respective slit is defined by a pair of convex walls so that the fishing line 13 may be easily snapped into and retained within the eyelet opening.

The water kite 10 also includes a rotating arm assembly 30 that is disposed centrally between the eyelets 20 and 22 and slightly above the geometric center of the plate 12. The rotating arm assembly 30 includes a base 31 which is integrally connected to the plate 12 and that protrudes perpendicularly outwardly therefrom. The base 31 has a rectangular shape of uniform cross section and protrudes perpendicularly from the plate 12 approximately three-quarters of an inch.

As best seen in FIG. 5, the base 31 is generally circular at its free end 43 opposed the plate 12 and is approximately one-half inch in width and one quarter inch in thickness. The base 31 includes a hole 42 that is centrally disposed adjacent the free end 43 of the base. The hole 42 is adapted to receive the shank of a screw 33.

The rotating arm assembly 30 also includes an arm 32. The arm 32 is generally rectangular in shape but being slightly tapered at its free end 51. Both ends 51 and 52 of the arm 32 are generally circular. A pair of holes, such as hole 38, are centrally disposed at each respective end 51 and 52 of the arm 32.

The hole 38 is adapted to receive the shank of the screw 33. The shank of screw 33 passes through hole 38 in the arm 32 and hole 42 of the base 31 to pivotally mount end 52 of the arm 32 to the base 31. The screw 33 is also adapted to receive a nut 34 to enable the arm 32 to be releasably secured to the base 31.

For the purpose of releasably securing the fishing line 13 to the water kite 10, end 51 of the arm 32 disposed furthest from the base 31 has secured to its upper surface thereof a retaining member 40. The retaining member 40 includes a pair of clamps 40A and 40B for pinching and holding line 13 therebetween. The clamps 40A and 40B are biased together by a spring (not shown) therein permitting the line 13 to be released from the returning member 40 when a fish strikes the lure taking the bait. With this configuration a fisherperson is able to use the kite 10 like a standard fishing bob to signal when a fish has taken the bait.

In operation, in order to adjust the location of the water kite 10 in the water relative to the location of a user, for example, must loosen the nut 34 and then rotate the arm 32 to a desired angular position relative to the plate 12. After rotating the arm 32 to the desired position, the user tightens the nut 34 to lock the arm 32 in place. The fishing line 13 is then snapped between the slots 20A and 22A into the respective eyelets 20 and 22 so the kite 10 may freely slide on the line 13. The free end of the line 13 with the lure or bait attached thereto is then secured to the kite 10 by pinching the line in the retaining member 40 so that it is releasably secured to the retaining member 40 and thereby allowing the lure or bait to be held on the end of the line 13 and relative to the retaining member 40. The kite 10 is then placed in the water and the line 13 is allowed to be extended from the fisherperson's reel (not shown). As the line 13 is extended from the reel, the float 14 will float on the water 50 while the flow of the water 50 against the plate 12 will cause the kite 10 to plane or drive through the water 50 at an angle determined by the angular setting of the arm 32 relative to plate 12.

Considering now the base 31 in greater detail with reference to FIGS. 1, 5 and 7, the base 31 includes an upper surface 40C and a lower surface 41. The upper surface 40C includes a set of dimples or circular notches generally indicated at 35A through 35H that surround the hole 42. In the preferred embodiment the dimples are equally spaced around the hole 42 and have a 0.031 inch radius and are 0.031 inches deep straddling center line on a 0.375 inch diameter circle. The dimples are adapted to engage a pair of detents 36 and 37 disposed on the arm 32 which will be described hereinafter in greater detail.

Considering now the arm 32 in greater detail with reference to FIGS. 1, and 6 the arm 32 is generally a elongated plate like body of uniform cross section thickness. The circular ends 51 and 52 of the arm 32 permit rotation of the arm 32 relative to the base 31. The arm 32 has an upper surface 53 and a lower surface 54 so that when the arm 32 is secured to the base 31, the lower surface 54 of the arm is mounted flush against the upper surface 40C of the base 31.

For the purpose of fixing the orientation of the longitudinal axis of the arm 32 relative to the base 31, the lower surface of the arm 32 includes the detent studs 36 and 37 that are disposed adjacent the terminal end 52 of the arm. The detent studs have a 0.031 inch radius on a center line of a 0.375 inch diameter circle and are so disposed that they will engage two of the dimples, such as dimple 35A and 35B of the base 31 when the arm 32 is secured to the base 31.

According to the invention, the arm 32 can rotate approximately 180° in a horizontal plane about the screw 33. In this regard, rotational movement of the arm 32 can be fixed in any one of sixteen discrete position thereby permitting a user to control the angular placement of the water kite 10 in the water 50 relative to the user whether trolling from a boat or standing on the bank of a stream or river.

Considering now the retaining member 40 in greater detail with respect to FIG. 1, the retaining member includes the clip 44 that is adapted to releasably engage the line 13. The clip 44 is secured to the arm 32 by a screw and nut (not shown).

Considering now the method of attaching the fishing line 13 to the water kite 10 in greater detail with reference to FIG. 1, a portion of the fishing line 13 is held between the fingers of a user and aligned with the slot 22A of eyelet 22. The line 13 is then urged upwardly into slot opening 22A until the line shops through the slots opening 22A into the eyelet hole. This process is repeated with respect to eyelet 20. When the line 13 is attached to the water kite 10 in this manner, a portion of the line 13 is aligned in a generally parallel relationship to the planar surface of the plate 12, and allows the water kite 10 to freely slide on the line 13.

Once the line has been slidably attached to the water kite 10, a portion of the line is looped backwardly and outwardly toward the distal end of arm 32. Clip 40 is then opened by depressing lever arm 44 of the clip downward to separate the clip ends 40A and 40B. Line 13 is then inserted between the opposing surfaces of the clip ends 40A and 40B. Lever arm 44 is then released thereby pinching and holding the line 13 between the opposing surfaces of clip ends 40A and 40B.

Referring now to FIG. 1 it will be noted that when the line is attached to the water kite 10 in the manner above described that the line forms a generally triangular formation following an imaginary line from eyelet 22A to the distal end of arm 32, from the distal end of arm 32 to eyelet 20A, and back from eyelet 20A to eyelet 22A. Such a configuration is a structurally solid orientation and assures that when the kite 10 is drawn through the water by line 10 that it will follow a precise course line in a relatively stable manner.

FIG. 3 illustrates a water kite 110, which is also constructed according to the present invention. The water kite 110 is similar to the water kite 10 and includes a plate 112, a float 114 and an elongated axially extending protuberance 116 that is integrally disposed on the lower end of plate 112. The plate 112 includes a pair of spaced apart parallel protuberances 120 and 122 that protrude from one side of the plate 112 and disposed at diametrically opposite ends of the plate 112 adjacent the float 114.

As best seen in FIGS. 3 and 4, a rigid looped wire 121 is disposed on the protuberance 120. A similar looped wire 123 is disposed on protuberance 122 in a parallel spaced apart manner from wire 121. The wires 121 and 123 thus serve as eyelets and are so constructed that a fisherperson using the water kite 110 may easily and conveniently thread a fishing line around the wire so that the line may freely slide through the loop thereof. In this manner; a fisherperson may attach the line to the water kite 110 without removing the bait or lure from the line.

The water kite 110 also includes a rotating arm assembly 130 that includes a base 131 that is substantially identical to the base 31 and an arm 132 that is secured to the base 131 by a nut 134 and screw 133 that are substantially similar to nut 34 and screw 33.

Considering now the arm 132 in greater detail with reference to FIGS. 4 and 8, the arm 132 has a rectangular shape of uniform cross section and having circular ends 151 and 152 to permit rotation of the arm 132 relative to the base 131. The arm has an upper surface 153 and a lower surface 154 so that when the arm 132 is secured to the base 131, its lower surface 154 is mounted flush against the upper surface 140 of the base 131.

For the purpose of fixing the orientation of the longitudinal axis of the arm 132 relative to the base 131, the lower surface 154 of the arm 132 includes a pair of detent studs 136 and 137 that are disposed adjacent the terminal end 152 of the arm 132. The detent studs are dimensioned substantially identically to the detent studs of the arm 32 so that dimples 136 and 137 will engage two of the dimples of the base 131, when base 131 is secured to the base 131.

For the purpose of releasably securing a fishing line, such as fishing line 13, to the water kite 110, the end 151 of the arm 132 disposed furtherest from the base 131 is adapted with a retaining member 130, which releasably secures or holds the line to the kite 110.

As best seen in FIG. 9, the terminal end 151 of the arm 132 is counter sunk with hexagonal opening 155 that is adapted to receive a hexagonal nut (not shown). A hole 156 extends from the upper surface 153 of the arm 132 through the opening 155. The hole 156 is adapted to receive a screw, such as screw 133. With this configuration, when a hexagonal nut is inserted into the opening 155, the walls of the opening 155 act as a stop to prevent the rotation of the nut as it receives a screw, such as screw 143. In the preferred embodiment, a rubber washer or grommet 159 is placed between the head of the screw and the upper surface 153 of the arm.

In operation, for the purpose of releasably retaining the line to the water kite 110, the line is placed under the washer 159 and against the upper surface 153 of the arm 132. The fisherperson then rotates the screw 143 into the nut (not shown). As the nut is held by the walls of the opening 155, the fisherperson is able to selectively tighten the nut 134 with screw 133 and thereby control the amount of releasing force that must be applied to the line to release it from between the upper surface 153 of the arm 132 and the washer 159.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A fishing apparatus, comprising:
   a plate having a float at its upper end and an elongated axially extending protuberance at its lower end to maintain the plate vertical in the water;
   means for slidably securing a fishing line to said plate; said means being disposed on one side of said plate and said line being freely slidable relative to the plate;
   means for releasably securing said fishing line to said plate and for guiding said plate in predetermined discrete angles relative to the fishing line when said plate is drawn through water; and
   wherein said means for slidably securing a fishing line to said plate is a pair of eyelets each with a slit defined by a pair of convex walls for releasably receiving the fishing line within said eyelet.

2. The fishing apparatus of claim 1, wherein said eyelets are spaced apart and parallel to one another for slidably securing a fishing line to said plate.

3. The fishing apparatus of claim 1 wherein said means for releasably securing said fishing line to said plate includes a base member extending perpendicularly from one side of said plate and a rotating arm member having a retaining member for releasably retaining the fishing line to said rotating arm member.

4. The fishing apparatus of claim 3, wherein said base member includes control means for selectively positioning the angular position of the rotating arm member relative to the base member;
   said control means comprising a plurality of dimples for selectively receiving a pair of detents studs disposed on said rotating arm member.

5. The fishing apparatus of claim 4, wherein said detent studs downwardly depend from one end of said rotating arm member, said detent studs being dimensioned to be received with said dimples.

6. The fishing apparatus of claim 5, wherein said rotating arm member may be pivotally rotated 180° about a horizontal axis relative to said base member.

7. The fishing apparatus of claim 6, wherein said retaining member is disposed on the free end of said rotating arm member, said retaining member including a spring biased clamp for retaining the fishing line to said rotating arm member.

8. The fishing apparatus of claim 3, wherein said retaining member is disposed on the free end of said rotating arm member, said retaining member including a screw, a nut, and a washer grommet.

9. A fishing apparatus, comprising:
   a plate having a float at its upper end and an elongated axially extending protuberance at its lower end to maintain the plate vertical in the water;
   means for slidably securing a fishing line to said plate; said means being disposed on one side of said plate and said line being freely slidable relative to the plate;
   means for releasably securing said fishing line to said plate and for guiding said plate in predetermined discrete angles relative to the fishing line when said plate is drawn through water; and
   wherein said means for slidably securing said fishing line to said plate includes a pair of looped wires mounted on one side of said plate in parallel spaced relationship.

* * * * *

UNITED STATES PATENT AND TRADEMARK OFFICE
CERTIFICATE OF CORRECTION

PATENT NO. : 4,920,689

DATED : May 1, 1990

INVENTOR(S) : Kenneth D. Anderson

It is certified that error appears in the above-identified patent and that said Letters Patent is hereby corrected as shown below:

Column 7, line 33, delete "detent studs", and substitute --dimples--.

Column 7, line 34, delete "the arm 32", and substitute --base 131--.

Column 7, line 35,36 delete "base 131", and substitute --the arm 132--.

Column 8, line 43, after "claim", delete "6", and substitute therefor --3--.

Signed and Sealed this

First Day of September, 1992

Attest:

DOUGLAS B. COMER

*Attesting Officer*     Acting Commissioner of Patents and Trademarks